(12) United States Patent
Chien et al.

(10) Patent No.: US 11,146,769 B2
(45) Date of Patent: Oct. 12, 2021

(54) PROJECTION DEVICE AND IMAGE ADJUSTING METHOD

(71) Applicant: Coretronic Corporation, Hsin-Chu (TW)

(72) Inventors: Chun-Lin Chien, Hsin-Chu (TW); Yung-Chiao Liu, Hsin-Chu (TW)

(73) Assignee: Coretronic Corporation, Hsin-Chu (TW)

(*) Notice: Subject to any disclaimer, the term of this patent is extended or adjusted under 35 U.S.C. 154(b) by 36 days.

(21) Appl. No.: 16/843,900

(22) Filed: Apr. 9, 2020

(65) Prior Publication Data
US 2020/0329221 A1 Oct. 15, 2020

(30) Foreign Application Priority Data
Apr. 10, 2019 (CN) .......................... 201910283865.6

(51) Int. Cl.
*H04N 9/31* (2006.01)
*H04N 5/74* (2006.01)
*G03B 21/00* (2006.01)

(52) U.S. Cl.
CPC ......... *H04N 9/3185* (2013.01); *G03B 21/005* (2013.01); *H04N 5/7475* (2013.01)

(58) Field of Classification Search
CPC ........ H04N 9/31; H04N 9/3185; H04N 9/147; H04N 5/7475; G03B 21/005; G03B 21/13
USPC ...................................... 359/443; 353/69, 70
See application file for complete search history.

(56) References Cited

U.S. PATENT DOCUMENTS

| | | | |
|---|---|---|---|
| 8,109,639 B2* | 2/2012 | Furui | H04N 9/3185 353/69 |
| 8,750,646 B2 | 6/2014 | Yoshimura | |
| 2014/0267341 A1* | 9/2014 | Imai | H04N 9/3185 345/581 |
| 2019/0073753 A1* | 3/2019 | Yamauchi | H04N 9/00 |
| 2019/0238807 A1* | 8/2019 | Furui | H04N 9/3185 |
| 2020/0007834 A1* | 1/2020 | Uemura | H04N 9/3185 |
| 2020/0169706 A1* | 5/2020 | Mori | H04N 9/3185 |

FOREIGN PATENT DOCUMENTS

CN 107079129 8/2017

* cited by examiner

*Primary Examiner* — William C. Dowling
(74) *Attorney, Agent, or Firm* — JCIPRNET

(57) ABSTRACT

A projection device including a projecting unit, an input unit and a processor and an image adjusting method of the projection device are provided. The projecting unit projects a first image to a projection surface. The input unit receives an input operation. The processor is electrically connected to the projecting unit and the input unit. The processor divides the first image into at least one block according to the input operation, selects one block from the at least one block to serve as a to-be-adjusted block, defines at least one control point within the to-be-adjusted block, and adjusts a position of the at least one control point so as to adjust a part of the first image. With the device and method provided, a user may independently adjust one block of the image without adjusting other blocks, so as to improve image authenticity and user satisfaction.

22 Claims, 5 Drawing Sheets

PROJECTION DEVICE AND IMAGE ADJUSTING METHOD

CROSS-REFERENCE TO RELATED APPLICATION

This application claims the priority benefit of China application serial no. 201910283865.6, filed on Apr. 10, 2019. The entirety of the above-mentioned patent application is hereby incorporated by reference herein and made a part of this specification.

BACKGROUND

Technical Field

The invention relates to a projection technique, and particularly relates to a projection device and an image adjusting method.

Description of Related Art

With the development of the projection technology, user's requirements for image authenticity, which may be an important factor affecting user's satisfaction, are gradually increased. Since an image projected may be deformed due to factors including optical structures of a projection device and flatness of a projection surface, the image deformation correct function may be required for the projection device, so that the user may adjust the image to achieve a better authenticity of the image. However, when the adjustment is performed, the overall image may be adjusted, that is, when a deformed area of the image is adjusted, other non-deformed areas may be undesirably adjusted, causing a decrease in user satisfaction. Therefore, solutions for partially adjusting an image are required.

The information disclosed in this Background section is only for enhancement of understanding of the background of the described technology and therefore it may comprise information that does not form the prior art that is already known to a person of ordinary skill in the art. Further, the information disclosed in the Background section does not mean that one or more problems to be resolved by one or more embodiments of the invention were acknowledged by a person of ordinary skill in the art.

SUMMARY

The invention is directed to a projection device and an image adjusting method and with the projection device and the method, a user may independently adjust a specific block of an image.

An embodiment of the invention provides a projection device including a projecting unit, an input unit and a processor. The projecting unit projects a first image to a projection surface. The input unit receives an input operation. The processor is electrically connected to the projecting unit and the input unit. The processor selects a block-number option from a first group comprising a plurality of block-number options, such that the first image is divided into at least one block according to the input operation received by the input unit. The processor selects one block from the at least one block to serve as a to-be-adjusted block according to the input operation received by the input unit. The other blocks of the at least one block serve as not-adjusting blocks. The processor selects one control-point-number option from a second group comprising a plurality of control-point-number options for the to-be-adjusted block according to the input operation received by the input unit, so as to define at least one control point in within the to-be-adjusted block. The processor adjusts a position of the at least one control point to adjust a part of the first image.

An embodiment of the invention provides an image adjusting method of a projection device. The projection device includes a projecting unit, an input unit and a processor. In the image adjusting method, the projecting unit projects a first image to a projection surface. The input unit receives an input operation. The processor selects a block-number option from a first group comprising a plurality of block-number options, such that the first image is divided into at least one block according to the input operation received by the input unit. The processor selects one block from the at least one block to serve as a to-be-adjusted block according to the input operation received by the input unit, and the other blocks of the at least one block serve as not-adjusting blocks. The processor selects one control-point-number option from a second group comprising a plurality of control-point-number options for the to-be-adjusted block according to the input operation received by the input unit, so as to define at least one control point in within the to-be-adjusted block. The processor adjusts a position of the at least one control point to adjust a part of the first image.

Based on the above description, with the projection device and the image adjusting method of the embodiments of the invention, a user may adjust a block of an image independently without adjusting other blocks, so as to improve the image authenticity and enhance user satisfaction.

Other objectives, features and advantages of the present invention will be further understood from the further technological features disclosed by the embodiments of the present invention wherein there are shown and described preferred embodiments of this invention, simply by way of illustration of modes best suited to carry out the invention.

To make the aforementioned more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

It is to be understood that other embodiment may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1A:
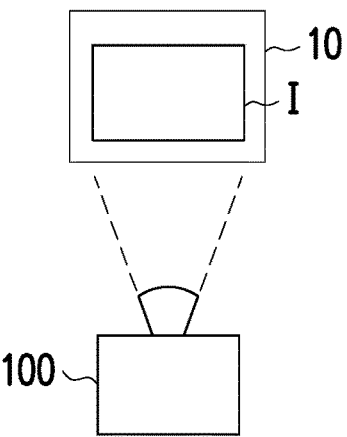
FIG. 1A and FIG. 1B are schematic diagrams of a projection device according to an embodiment of the invention.
Figure 1B:
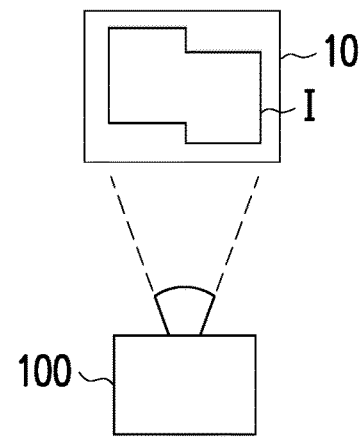

FIG. 1A and FIG. 1B are schematic diagrams of a projection device according to an embodiment of the invention. Referring to FIG. 1A and FIG. 1B, in an embodiment of the invention, the projection device 100 may emit a light beam, such that an image I may be projected to a projection surface 10. As shown in FIG. 1B, in case of an uneven projection surface 10, the projection device 100 may form an image I with an irregular contour on the projection surface 10. For example, a discontinuous image I with a contour as shown in FIG. 1B may be formed on the projection surface 10.

Figure 2:
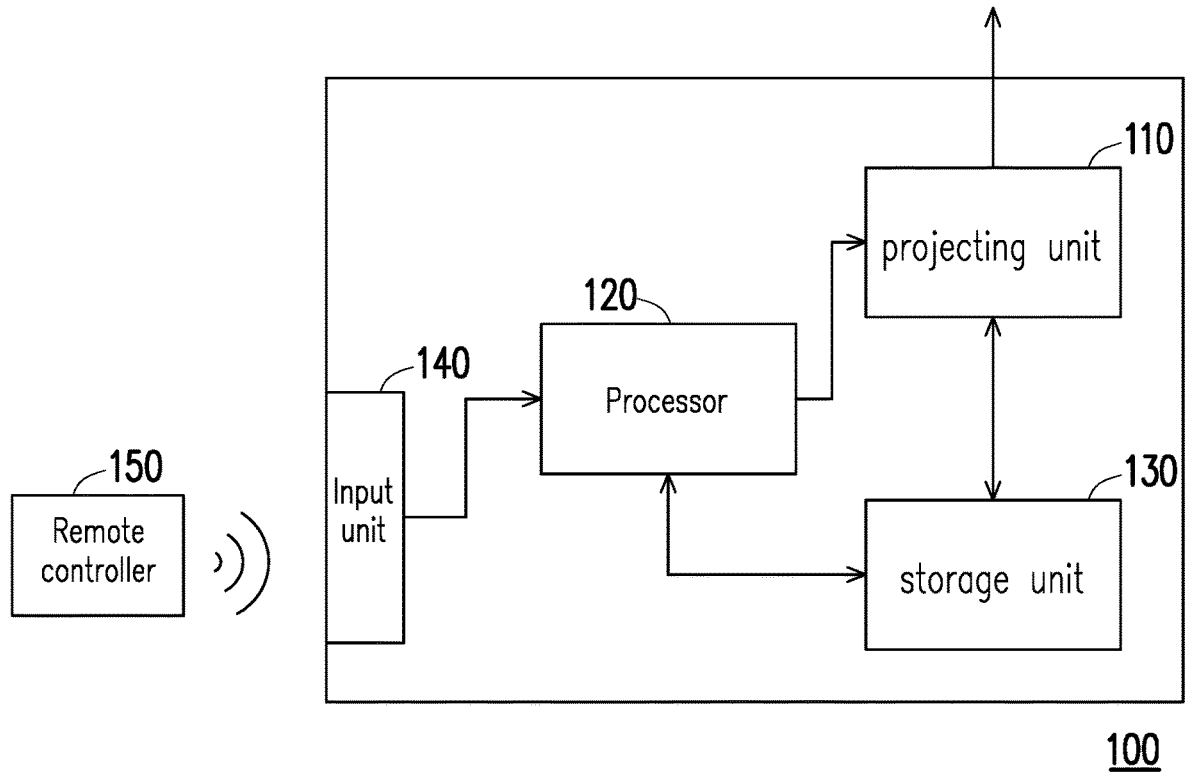
FIG. 2 is a schematic block diagram of a projection device according to an embodiment of the invention.

FIG. 2 is a schematic block diagram of a projection device according to an embodiment of the invention. Referring to FIG. 2, in an embodiment of the invention, the projection device 100 includes a projecting unit 110, a processor 120, a storage unit 130 and an input unit 140. The projecting unit 110 is configured to emit a light beam to project an image onto the projection surface 10. For example, the projecting unit 110 may be a projector. In some embodiments, the projecting unit may include a light source module, a light valve and a projection lens. However, the invention is not limited thereto.

The light source module (not shown) may include a plurality of solid-state illumination sources, for example, light-emitting diodes (LED) or laser diodes. The light source module may also include a high-intensity discharge lamp. The illumination light beam generated by the light source module is converted into an image light beam by a light valve (not shown). The light valve includes, for example, a reflective or transmissive spatial light modulator. The spatial light modulator may include a Digital Micro-mirror Device (DMD) or a Liquid-Crystal-On-Silicon (LCOS) panel. The transmissive spatial light modulator may include, for example, a transmissive Liquid Crystal Display (LCD) panel. The image light beam is projected to the projection surface (for example, a screen, a wall, etc.) by using the projection lens, so as to form a projection image on the projection surface.

The input unit 140 may receive an input operation applied by a user to generate an input signal correspondingly. The processor 120 may execute a corresponding function or operation according to the input signal. The input unit 140 may include a plurality of physical buttons (for example, arrow keys or an enter key) used for different functions. In another embodiment, the input unit 140 may further include an infrared receiver to receive infrared rays from a remote controller 150, so as to generate a control signal. The control signal may then be transmitted to the processor 120, so that a corresponding function may be executed.

In the embodiment of FIG. 2, the processor 120 is configured to execute various operations required by the projection device 100. The processor 120 is electrically connected to the projecting unit 110 and the input unit 140. In an embodiment of the invention, the processor 120 may include, for example, a Central Processing Unit (CPU), a microprocessor, a Digital Signal Processor (DSP), a programmable controller, a Programmable Logic Device (PLD) or other similar devices or a combination of the above devices, which is not limited by the invention.

In an embodiment of the invention, the projection device 100 may further include a plurality of arrow keys and an enter key, such that the user may perform the input operation to the projection device 100 through the arrow keys (for example, up, down, left, right arrows) or the enter key. In some embodiments, the arrow keys and the enter key may be disposed on a casing of the projection device 100. However, the invention is not limited thereto. For example, in other embodiments, the arrow keys may be respectively disposed on the remote controller 150. For example, the arrow keys and the enter key may be disposed on the casing of the projection device 100 and electrically connected to the processor 120. When the arrow keys or the enter key receive an external trigger signal (for example, when an arrow key or the enter key is pressed), a corresponding signal is generated and transmitted to the projecting unit 110.

In some embodiments of the invention, the arrow keys and/or the enter key may be physical buttons. However, the invention is not limited thereto, and in other embodiments, the arrow keys and/or the enter key may be implemented as regions on the touch panel capable of sensing pressures and/or temperatures.

In some embodiments of the invention, the projection device 100 may further include a storage unit 130, and the storage unit 130 may be electrically connected to the projecting unit 110 and the processor 120. The storage unit 130 is configured to temporarily or permanently store data according to an instruction of the processor 120. In some embodiments, the storage unit 130 may be disposed in the projecting unit 110. In some embodiments, the storage unit 130 may be implemented as a Dynamic Random Access Memory (DRAM), a flash memory or a Non-Volatile Random Access Memory (NVRAM), etc. In the embodiment, the storage unit 130 may be used for storing various instructions or data required for implementing various embodiments of the invention, so as to implement operations of the embodiments.

Figure 3:
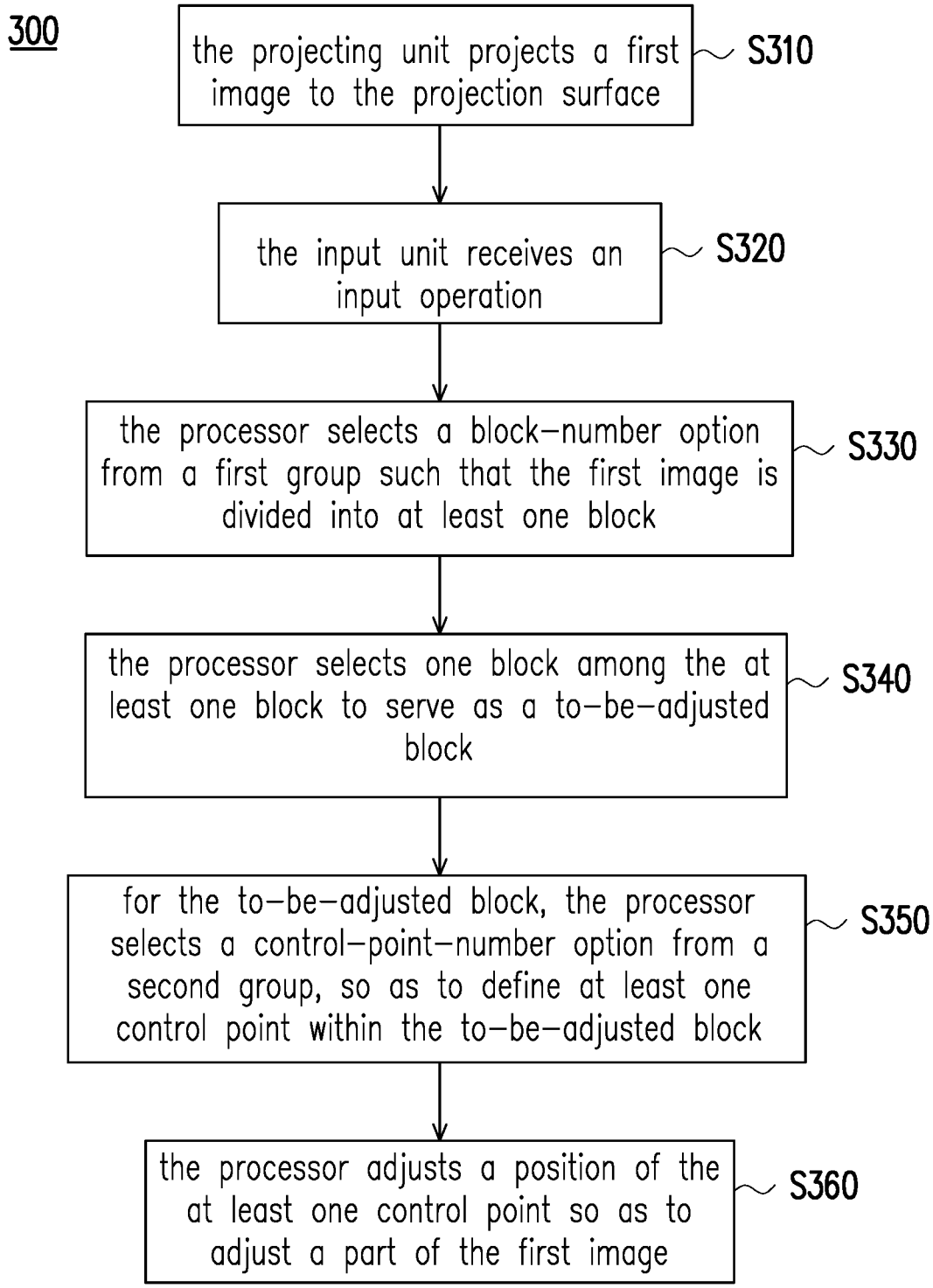
FIG. 3 is a schematic flowchart illustrating an image adjusting method according to an embodiment of the invention.

FIG. 3 is a schematic flowchart illustrating an image adjusting method according to an embodiment of the invention. The image adjusting method 300 shown in FIG. 3 may be executed by the projection device 100 of FIG. 2, but the invention is not limited thereto. The image adjusting method 300 of the embodiment of FIG. 3 is described below with reference of the projection device 100 of the embodiment of FIG. 2.

Figure 4:
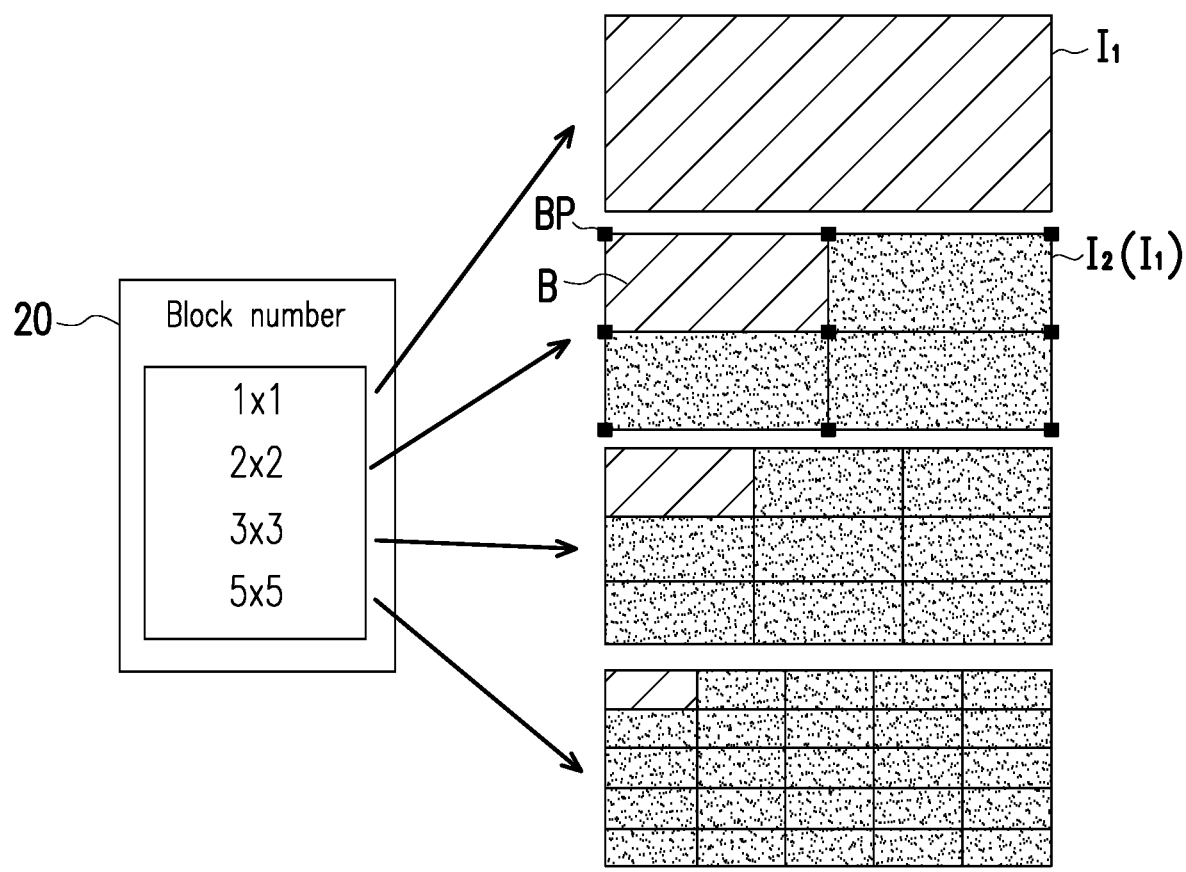
FIG. 4 is a schematic diagram of block division of the image adjusting method according to an embodiment of the invention.

In an embodiment of the invention, referring to FIG. 2, FIG. 3 and FIG. 4, in a step S310, the projecting unit 110 projects a first image I1 onto the projection surface 10.

Referring to FIG. 2, FIG. 3 and FIG. 4, in a step S320, the input unit 140 receives an input operation performed by the user. In a step S330, the processor 120 selects a block-number option from a first group, such that the first image I1 is divided into at least one block B according to the input operation performed by the user. The first group comprises a plurality of block-number options. The input unit 140 receives the input operation performed by the user to generate an input signal correspondingly. The projecting unit 110 may execute a function or operation according to the input signal.

To be specific, referring to FIG. 3 and FIG. 4, FIG. 4 is a schematic diagram of block division of the image adjusting method according to an embodiment of the invention. In the step S330, when the user presses one or more physical buttons on the remote controller 150 or on the projection device 100, an option image 20 (for example, an on screen display image) may therefore be generated. The option image 20 may be displayed on the remote controller 150, the casing of the projection device 100 or the projection surface 10. The option image 20 may present a plurality of block-number options, and the block-number options construct the first group. For example, the first group comprises four block-number options, and the four block-number options may respectively comprise display information of "1×1", "2×2", "3×3" and "5×5", but the invention is not limited thereto. In detail, through the option image 20, the user may select the number of blocks to be divided by using the arrow keys and the enter key. In some embodiments, the user may trigger the arrow keys and the enter key on the casing of the projection device 100 or on the remote controller 150 by means of pressing, touching, etc., so as to select a block-number option among the block-number options presented in the option image 20. For example, the user may press an arrow key of a "down arrow", and now since the "down arrow" is triggered, a direction signal corresponding to "down" is generated, so that in the option image 20 shown in FIG. 4, the selected block-number option is changed from "1×1" to "2×2". Then, the user may press the enter key to generate a confirmation signal corresponding to the block-number option "2×2", so that the first image I1 is divided according to the block-number of "2×2".

In some embodiments, each one of the block-number options may be associated with a set of instructions stored in the storage unit 130 (shown in FIG. 2). Further, taking the block-number option "2×2" as an example, a set of instructions corresponding to the block-number option "2×2" is stored in the storage unit 130. When the block-number option "2×2" is selected, the projecting unit 110 may project "2×2" (i.e., four) second sub-images on the projection surface 10 based on the set of instructions, namely, the number of the second sub-images may be complied with the display information "2×2" of the selected block-number option. However, the invention is not limited thereto. In some embodiments, the combined image constructed by the second sub-images may be referred to as a second image I2, and the first image I1 and the second image I2 may be displayed on the display surface 10 at the same time, and overlapped with each other. In the embodiment, the second sub-images are, for example, four rectangular frames, and the second image I2 is a grid image including the four rectangular frames. The grid image may be superimposed onto the first image I1, such that the first image I1 is divided into four blocks B, and the four blocks B of the first image I1 are respectively located within the four rectangular frames of the second image I2.

In the embodiment, the first image I1 is divided into two blocks B in a row direction, and two blocks B in a column direction. From an overall view, the second image I2 comprises three block points BP in the row direction and three block points BP in the column direction. Therefore, by connecting the block points BP with lines, 2×2 second sub-images are constructed, so that the first image I1 is divided into 2×2 blocks. It should be noted that in the embodiment, in the row direction and/or the column direction, the block points BP may be arranged at equal intervals, and the number of control points generated in the row direction is the same as the number of control points generated in the column direction. Taking the three block points BP in the row direction as an example, two block points BP may be respectively located a boundary of the first image I1, and the other block point BP is located at the middle of the above two block points BP, such that the width of each block B of the first image I1 may be identical, but the invention is not limited thereto. It should be noted that division of the first image I1 in the column direction is similar to that in the row direction, which is not repeated for clarity's sake.

However, it should be understood that the number and form of the second sub-images of the second image I2 are only illustrated an example, which are not intended to limit the invention. In some embodiments, the second image I2 may be displayed on the projection surface 10 by way of an On Screen Display (OSD) image display technique.

In the embodiment, before image adjustment is performed, the user may trigger (such as, press, touching or other manner) a menu key disposed on the remote controller 150, so that the remote controller 150 or the projection device 100 may display the option image 20.

Referring back to FIG. 3, in a step S340, the processor 120 selects one block among the at least one block B of the first image I1 according to the input operation from the user, and the selected one serves as a to-be-adjusted block. The other blocks of the at least one block serve as not-adjusting blocks.

Figure 5:
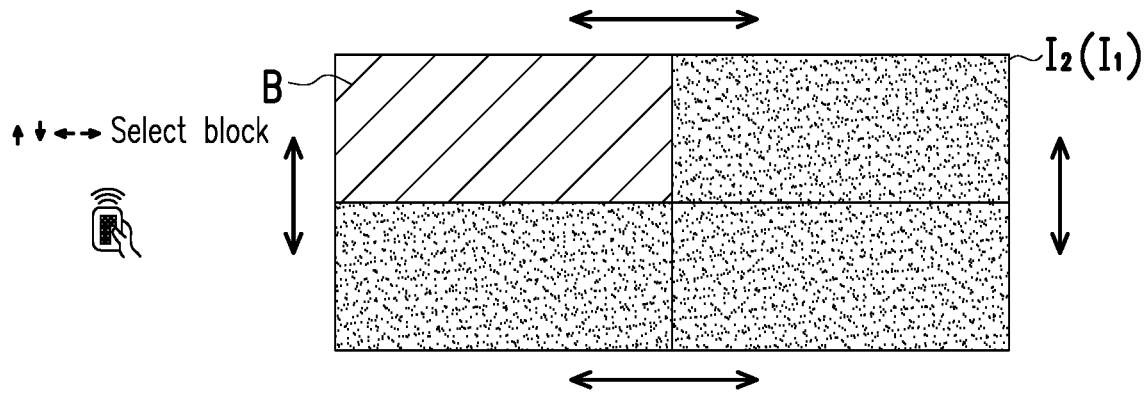
FIG. 5 is a schematic diagram of block selection of the image adjusting method according to an embodiment of the invention.

To be specific, referring to FIG. 3 and FIG. 5, FIG. 5 is a schematic diagram of block selection of the image adjusting method according to an embodiment of the invention. In the embodiment, one of the plurality of second sub-images of the second image I2 is, for example, displayed in a higher brightness to indicate one block B of the first image I1 covered by the second sub-image to be a selected block. However, the invention is not limited thereto, for example, in other embodiments, the selected block of the first image I1 may also be shown differently from other blocks by highlighting, in a different color, or with an indicator.

In the embodiment, the user may use the arrow keys to change the selected block, for example, the user may press the right arrow to change the second sub-image located at right side in high brightness. Correspondingly, in the first image I1, the block B located at the right side is changed to the selected block. Further, when the user presses the right arrow, the right arrow is triggered to generate a "right" direction indication signal, and such signal is transmitted to the projecting unit 110. Therefore, in the second image I2 projected by the projecting unit 110, the second sub-image displayed in high brightness is shifted right by one grid. Correspondingly, in the first image I1, the selected block is shifted right by one grid, and so on. The user may select the to-be-adjusted block among the plurality of blocks B of the first image I1 by operating the arrow keys of the up, down, left, and right directions, and the user may set the selected block as the to-be-adjusted block by using the enter key. Further, when the user presses the enter key, the enter key is triggered to generate a confirmation signal, and such signal is transmitted to the projecting unit 110. Therefore, the block B covered by the second sub-image displayed in high brightness is set to the to-be-adjusted block.

Referring to FIG. 3, in a step S350, for the to-be-adjusted block, the processor 120 selects a control-point-number option from a second group according to the input operation received by the input unit 140, so as to define at least one control point within the to-be-adjusted block. The second group comprises a plurality of control-point-number options.

Figure 6:
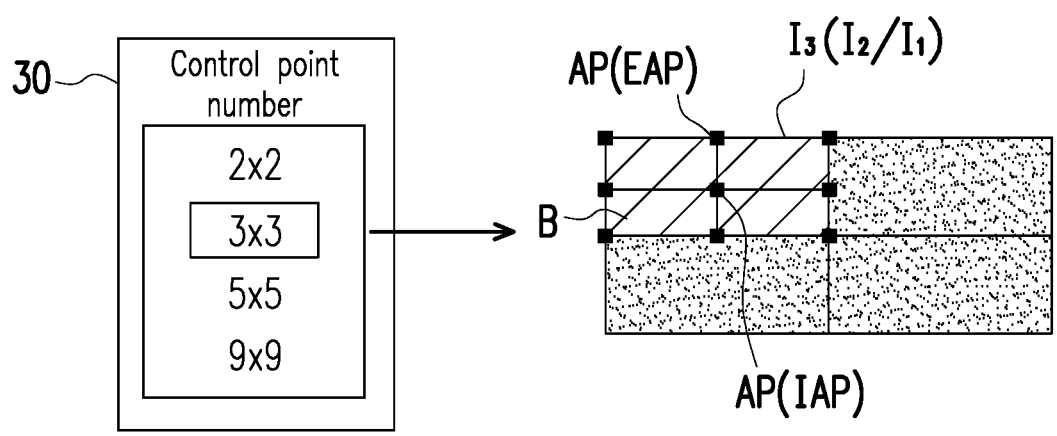
FIG. 6 is a schematic diagram of control-point-number selection of the image adjusting method according to an embodiment of the invention.

To be specific, at least one control point is defined within the to-be-adjusted block according to a control-point-number specified by the control-point-number option selected. In the step S350, an option image 30 may be displayed on the remote controller 150, the casing of the projection device 100 or on the projection surface 10, and the option image may present a plurality of control-point-number options, for example, options of "2×2", "3×3", "5×5" and "9×9" as shown in FIG. 6. These control-point-number options construct the second group. Referring to FIG. 3 and FIG. 6, FIG. 6 is a schematic diagram of control-point-number selection of the image adjusting method according to an embodiment of the invention. The second group may include four control-point-number options, and the four control-point-number options may respectively include display information of "2×2", "3×3", "5×5" and "9×9", but the invention is not limited thereto. In detail, with the presented the option image 30, by using the arrow keys and the enter key, the user may select the number of control points to be defined in the to-be-adjusted block of the first image. The user may trigger the arrow keys or the enter key such as by pressing, touching, or other manner, so as to select one control-point-number option among the control-point-number options in the option image 30. For example, the user may press an arrow key of a "down arrow", and now since the "down arrow" is triggered, a direction signal corresponding to "down" is generated, and such signal is transmitted to the projecting unit 110. In the option image 30, the selected control-point-number option is changed from "2×2" to "3×3". Then, the user may press the enter key to generate a confirmation signal corresponding to the control-point-number option "3×3", so as to define the control points with the number of "3×3" for the block B to be adjusted of the first image I1.

In some embodiments, each one of the control-point-number options may be associated with a set of instructions stored in the storage unit 130. Further, taking the control-point-number option "3×3" as an example, a set of instructions corresponding to the control-point-number option is stored in the storage unit 130. When the control-point-number option "3×3" is selected, the projecting unit 110 may project "3×3" (i.e., 9) third sub-images on the projection surface 10 based on the set of instructions, namely, the number of the third sub-images may be complied with the display information of the selected control-point-number option. However, the invention is not limited thereto. In some embodiments, the image constructed by the third sub-images may be referred to as a third image I3, and the third image I3, the second image I2 and the first image I1 may be displayed on the display surface 10 at the same time. In the embodiment, the third sub-images are, for example, nine solid points, and the third image I3 is an image including the nine solid points. The image may be superimposed to the second image I2 and the first image I1, and may cover a second sub-image of the second image I2 and a block of the first image I1 mapped to the second sub-image.

It should be noted that the number and form of the third sub-images of the third image I3 are only illustrated an example, which are not intended to limit the invention. For example, in other embodiments, the third sub-image may include solid/hollow square points, solid/hollow round points, and/or solid/hollow triangle points. In some embodiments, the third image I3 may be displayed on the projection surface 10 by way of an OSD image display technique. However, the invention is not limited thereto, and in other embodiments, the optical image 30 may be displayed on the remote controller 150 or displayed on the casing of the projection device 100.

Further, taking the option of "3×3" as an example, as shown in FIG. 6, the third image I3 includes three control points AP in the row direction and three control points AP in the column direction. Namely, the number of the control points is nine. In this way, the image in the to-be-adjusted block of the first image I1 may be adjusted by adjusting positions of these control points AP in the row and column directions.

In some embodiments, in a first direction (for example, the row direction) and a second direction (for example, a column direction), the control points AP may be arranged at equal intervals. Taking the three control points in the row direction as an example, two control points AP thereof may be respectively located the boundary of the to-be-adjusted block, and the other control point AP is located at the middle of the above two control points AP, but the invention is not limited thereto.

In some embodiments, as show in FIG. 6, the plurality of control points AP may include edge control points EAP located at the boundary of the to-be-adjusted block, and an internal control point IAP located within the to-be-adjusted block.

Referring to FIG. 3, in a step S360, the processor 120 adjusts a position of the at least one control point AP, so as to adjust a part of the first image I1. In an embodiment of the invention, direction control signals may be generated through the arrow keys disposed on the remote controller 150 or on the casing of the projection device 100, so as to move positions of the control points on the projection surface 10. Correspondingly, the image in the to-be-adjusted block B of the first image I1 corresponding to the position of the control point AP is adjusted.

Figure 7A:
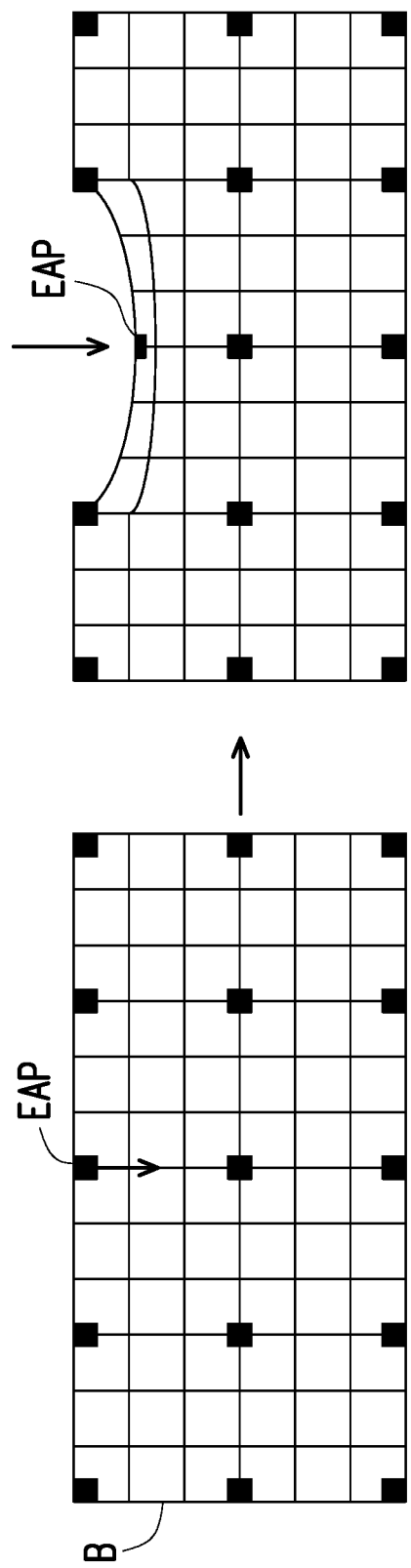
FIG. 7A and FIG. 7B are schematic diagrams of the adjustment of a to-be-adjusted block according to an embodiment of the invention.
Figure 7B:
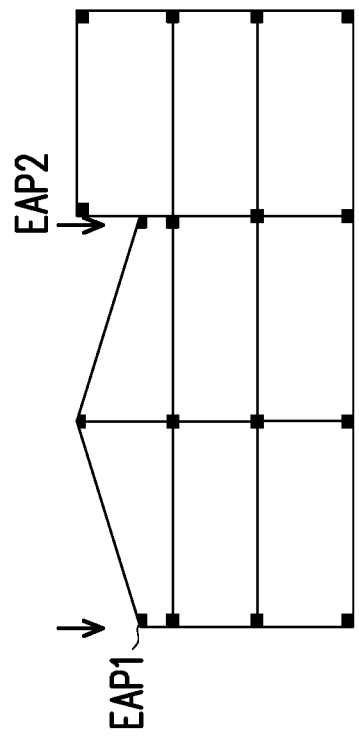

To be specific, referring to FIG. 7A and FIG. 7B, FIG. 7A and FIG. 7B are schematic diagrams of the adjustment of a to-be-adjusted block according to an embodiment of the invention.

In the embodiment of FIG. 7A, the user adjusts the position of the edge control point EAP. For example, in the embodiment, the user moves the position of the edge control point EAP downward. In response to the movement of the edge control point EAP, the processor 120 controls the projection device 110 to project an adjusting image to compensate the to-be-adjusted block B of the first image I1. In detail, compared to the first image, the adjusting image may be a deformed image. The deformation of the adjusting image corresponds to the movement of the edge control point EAP, and is configured to compensate the deformation, such as caused by unevenness of the projection surface 10, of the first image I1. Namely, the deformation of the adjusting image may be used to compensate the deformation of the first image I1, so as to present a desirable image on the projection surface 10, such that the image authenticity may be improved and the user satisfaction may be enhanced. In the embodiment that the user moves the position of the edge control point EAP downward, the part of the adjusting image corresponding to the position of the to-be-adjusted block B of the first image I1 is moved downward with the edge control point EAP as a deformation center. The deformation of the adjusting image may not be linear. That is, the closer the position is to the edge control point EAP, the more obvious the deformation of the adjusting image is, and the farther the position is from the edge control point EAP, the less obvious the deformation of the adjusting image is. However, the invention is not limited thereto.

In the embodiment of FIG. 7B, the user adjusts positions of the edge control points EAP1 and EAP2. For example, the user moves the positions of the edge control points EAP1 and EAP2 downward. In the embodiment, details that the projecting unit 110 projects the adjusting image to compensate at least a part of the first image I1 are similar to the embodiment of FIG. 7A, which are not repeated, and only differences there between are described below. In the embodiment of FIG. 7B, when the edge control point EAP2 is located at a junction of the to-be-adjusted block and the not-adjusting block, the part of the adjusting image projected by the image unit 110 corresponding to the position of the to-be-adjusted block has a deformation (which is, for example, moved downward), but the part of the adjusting image corresponding to the position of the not-adjusting block is not deformed. However, the invention is not limited thereto. As shown in FIG. 7B, the image located at left of the edge control point EAP2 (in the to-be-adjusted block) is adjusted, and the image located at right of the edge control point EAP2 (in the not-adjusting block) is not adjusted.

In some embodiments of the invention, during the image adjusting, the first image is divided into a plurality of blocks, and when the image in one of the blocks is adjusted, the images of the other blocks are maintained unchanged. In this way, in case that the projection surface 10 is discontinuous (as shown in FIG. 1B), the user may adjust different blocks of the image independently, so as to avoid troubles in user's adjustment caused by linkage deformation of the image.

In summary, with the projection device and the image adjusting method of the embodiments of the invention, a user may adjust a block of an image independently without adjusting other blocks, so as to improve the image authenticity and enhance user satisfaction.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projection device, comprising:
   a projecting unit, projecting a first image to a projection surface;
   an input unit, receiving an input operation;
   a processor, electrically connected to the projecting unit and the input unit, wherein the projecting unit, the input unit and the processor are respectively configured to perform the following operations:
   the processor selecting a block-number option from a first group according to the input operation received by the input unit, wherein the first group includes a plurality of block-number options, such that the first image is divided into at least one block;
   the processor selecting one block from the at least one block according to the input operation received by the input unit, wherein the block serves as a to-be-adjusted block and the other blocks of the at least one block serve as not-adjusting blocks, for the to-be-adjusted block, the processor selecting a control-point-number option from a second group according to the input operation received by the input unit, wherein the second group includes a plurality of control-point-number options, so as to define at least one control point within the to-be-adjusted block, the processor adjusting a position of the at least one control point so as to adjust a part of the first image.

2. The projection device according to claim 1, wherein the at least one control point comprises an edge control point located at a junction of the to-be-adjusted block and one not-adjusting block, and when a position of the edge control point is adjusted, a part of the first image located within the to-be-adjusted block is adjusted, and another part of the first image located within the not-adjusting block is not adjusted.

3. The projection device according to claim 1, wherein the operation that the processor adjusting the position of the at least one control point so as to adjust the part of the first image comprises: the processor controlling the projecting unit such that an adjusting image is projected by the projecting unit to compensate the to-be-adjusted block of the first image.

4. The projection device according to claim 3, wherein the adjusting image is a deformed image compared to the first image, the deformed image is deformed with the at least one control point as a deformation center, and the adjusting image is deformed with respect to a deformation of the first image.

5. The projection device according to claim 1, wherein the operation that the processor selecting one block from the at least one block to serve as the to-be-adjusted block according to the input operation received by the input unit comprises:
inputting at least one direction signal to select among the at least one block; and
inputting a confirmation signal to specify one block in the at least one block as the to-be-adjusted block.

6. The projection device according to claim 5, wherein the operation of inputting the at least one direction signal comprises pressing one of a plurality of arrow keys of the processor.

7. The projection device according to claim 5, wherein the operation of inputting the confirmation signal comprises pressing an enter key.

8. The projection device according to claim 1, wherein the operation that the processor dividing the first image into at least one block according to the input operation received by the input unit comprises:
projecting a second image to the projection surface, wherein the second image comprises at least one second sub-image, and the number of the at least one second sub-image is the same as the number of the at least one block.

9. The projection device according to claim 1, wherein the operation of defining at least one control point within the to-be-adjusted block comprises:
projecting a third image to the projection surface, wherein the third image comprises at least one third sub-image, and the number of the at least one third sub-image is the same as the number of the at least one control point.

10. The projection device according to claim 1, wherein the at least one control point within the to-be-adjusted block is evenly distributed in a first direction.

11. The projection device according to claim 10, wherein the at least one control point within the to-be-adjusted block is evenly distributed in a second direction, and wherein the second direction is perpendicular to the first direction.

12. An image adjusting method of a projection device comprising a projecting unit, an input unit and a processor, the image adjusting method comprising:
the projecting unit projecting a first image to a projection surface;
the input unit receiving an input operation;
the processor selecting a block-number option from a first group according to the input operation received by the input unit such that the first image is divided into at least one block, wherein the first group comprises a plurality of block-number options;
the processor selecting one block among the at least one block to serve as a to-be-adjusted block according to the input operation received by the input unit, wherein the other blocks of the at least one block serve as not-adjusting blocks;
for the to-be-adjusted block, the processor selecting a control-point-number option from a second group according to the input operation received by the input unit, so as to define at least one control point within the to-be-adjusted block, wherein the second group comprises a plurality of control-point-number options;
the processor adjusting a position of the at least one control point so as to adjust a part of the first image.

13. The image adjusting method according to claim 12, wherein the at least one control point comprises an edge control point located at a junction of the to-be-adjusted block and one not-adjusting block, and when a position of the edge control point is adjusted, a part of the first image located within the to-be-adjusted block is adjusted, and another part of the first image located within the not-adjusting block is not adjusted.

14. The image adjusting method according to claim 12, wherein the step that the processor adjusting the position of the at least one control point so as to adjust the part of the first image comprises: the processor controlling the projecting unit such that an adjusting image is projected by the projecting unit to compensate the to-be-adjusted block of the first image.

15. The image adjusting method according to claim 14, wherein the adjusting image is a deformed image compared to the first image, the deformed image is deformed with the at least one control point as a deformation center, and the adjusting image is deformed with respect to a deformation of the first image.

16. The image adjusting method according to claim 12, wherein the step of selecting one block from the at least one block to serve as the to-be-adjusted block comprises:
inputting at least one direction signal to select among the at least one block; and
inputting a confirmation signal to specify one block in the at least one block as the to-be-adjusted block.

17. The image adjusting method according to claim 16, wherein the step of inputting the at least one direction signal comprises pressing one of a plurality of arrow keys.

18. The image adjusting method according to claim 16, wherein the step of inputting the confirmation signal comprises pressing an enter key.

19. The image adjusting method according to claim 12, wherein the step of dividing the first image into at least one block comprises:
projecting a second image to the projection surface, wherein the second image comprises at least one second sub-image, and the number of the at least one second sub-image is the same as the number of the at least one block.

20. The image adjusting method according to claim 12, wherein the step of defining at least one control point within the to-be-adjusted block comprises:
projecting a third image to the projection surface, wherein the third image comprises at least one third sub-image, and the number of the at least one third sub-image is the same as the number of the at least one control point.

21. The image adjusting method according to claim 12, wherein the at least one control point within the to-be-adjusted block is evenly distributed in a first direction.

22. The image adjusting method according to claim 21, wherein the at least one control point within the to-be-adjusted block is evenly distributed in a second direction, wherein the second direction is perpendicular to the first direction.

* * * * *